United States Patent
Onishi et al.

(10) Patent No.: US 11,874,194 B2
(45) Date of Patent: Jan. 16, 2024

(54) VIBRATION PROCESSING APPARATUS, VIBRATION PROCESSING METHOD, AND NON-TRANSITORY COMPUTER-READABLE STORAGE MEDIUM

(71) Applicant: NEC Corporation, Tokyo (JP)

(72) Inventors: Yasuharu Onishi, Tokyo (JP); Yasuyuki Fukuta, Tokyo (JP); Sae Watanabe, Tokyo (JP); Noboru Tashiro, Tokyo (JP); Michio Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/795,028

(22) PCT Filed: Dec. 22, 2020

(86) PCT No.: PCT/JP2020/048040
§ 371 (c)(1),
(2) Date: Jul. 25, 2022

(87) PCT Pub. No.: WO2021/157232
PCT Pub. Date: Aug. 12, 2021

(65) Prior Publication Data
US 2023/0084675 A1 Mar. 16, 2023

(30) Foreign Application Priority Data
Feb. 3, 2020 (JP) ................................. 2020-016593

(51) Int. Cl.
*G01M 13/023* (2019.01)
*G01L 5/04* (2006.01)

(52) U.S. Cl.
CPC ........... *G01M 13/023* (2013.01); *G01L 5/042* (2013.01)

(58) Field of Classification Search
CPC .............................. G01L 5/042; G01M 13/023
See application file for complete search history.

(56) References Cited

U.S. PATENT DOCUMENTS 5,698,796 A * 12/1997 Hirano ..................... G01L 5/042
73/160
5,877,431 A * 3/1999 Hirano ..................... G01H 13/00
73/862.41
(Continued)

FOREIGN PATENT DOCUMENTS

CN 102730384 A 10/2012
CN 204549269 U 8/2015
(Continued)

OTHER PUBLICATIONS

International Search Report for PCT Application No. PCT/JP2020/048040, dated Mar. 23, 2021.
(Continued)

*Primary Examiner* — Eric S. McCall
(74) *Attorney, Agent, or Firm* — Sughrue Mion, PLLC (57) ABSTRACT

A vibration processing apparatus (10) includes: an acquisition unit (110) that reads, from a vibration information storage unit (112), information needed for detecting an abnormality in a belt conveyor (20), the information being, for example, first detection data indicating a result of detecting a vibration at a first point of the belt conveyor (20), and second detection data indicating a result of detecting a vibration at a second point on a downstream side of the first point of the belt conveyor (20); and a determination unit (120) that determines that an abnormality occurs in the belt conveyor with a necessary condition or a necessary and sufficient condition that a result of comparing the first detection data and the second detection data satisfies a first reference.

17 Claims, 7 Drawing Sheets

(56) References Cited

U.S. PATENT DOCUMENTS

| | | | |
|---|---|---|---|
| 2003/0033864 A1* | 2/2003 | Rankin | B25B 23/14 |
| | | | 73/114.01 |
| 2004/0066521 A1* | 4/2004 | Swab | G01L 5/042 |
| | | | 356/614 |
| 2007/0281813 A1* | 12/2007 | Schwarz | F16H 7/1281 |
| | | | 474/133 |
| 2014/0096608 A1* | 4/2014 | Themm | G01L 1/00 |
| | | | 73/579 |
| 2015/0253181 A1* | 9/2015 | Miyata | G01H 13/00 |
| | | | 73/579 |
| 2015/0276522 A1* | 10/2015 | Miyata | G01L 5/045 |
| | | | 73/862.41 |
| 2017/0038245 A1* | 2/2017 | Hartmann | G01S 13/50 |
| 2019/0137350 A1* | 5/2019 | Guru | G01M 13/028 |
| 2020/0032883 A1* | 1/2020 | Chinnel | G01L 5/042 |
| 2021/0206579 A1* | 7/2021 | Freitas | B25J 5/007 |
| 2022/0341775 A1* | 10/2022 | Fukuta | B65G 43/02 |
| 2023/0030522 A1* | 2/2023 | Onishi | B65G 27/04 |
| 2023/0063129 A1* | 3/2023 | Fogal, Jr. | C23G 1/125 |
| 2023/0084675 A1* | 3/2023 | Onishi | G01H 1/04 |
| | | | 73/862.41 |

FOREIGN PATENT DOCUMENTS

| | | |
|---|---|---|
| CN | 204549270 U | 8/2015 |
| JP | 2009-270843 A | 11/2009 |
| JP | 2018-024499 A | 2/2018 |
| TW | 201728888 A | 8/2017 |
| WO | 2010/142029 A1 | 12/2010 |
| WO | 2019/230088 A1 | 12/2019 |

OTHER PUBLICATIONS

Taiwan Office Action for TW Application No. 109146626, dated Feb. 18, 2023 with English Translation.

* cited by examiner

VIBRATION PROCESSING APPARATUS, VIBRATION PROCESSING METHOD, AND NON-TRANSITORY COMPUTER-READABLE STORAGE MEDIUM

This application is a National Stage Entry of PCT/JP2020/048040 filed on Dec. 22, 2020, which claims priority from Japanese Patent Application 2020-016593 filed on Feb. 3, 2020, the contents of all of which are incorporated herein by reference, in their entirety.

TECHNICAL FIELD

The present invention relates to a vibration processing apparatus, a vibration processing method, and a program.

BACKGROUND ART

There is a method using a vibration or an acoustic sensor for monitoring a facility. For example, a manufacturing loss is avoided by acquiring vibration data generated by a processing machine during processing of a production material and stopping the processing of the production material when an abnormal vibration is captured. Patent Document 1 discloses a method of attaching a sensor to a facility being a surveillance target, and monitoring the facility, based on time-series data measured by the sensor.

RELATED DOCUMENT

Patent Document

[Patent Document 1] Japanese Patent Application Publication No. 2009-270843

SUMMARY OF THE INVENTION

Technical Problem

The present inventor has considered a new technique for accurately determining whether an abnormality occurs in a belt conveyor. One example of an object of the present invention is to accurately determine whether an abnormality occurs in a belt conveyor.

Solution to Problem

The present invention provides a vibration processing apparatus including:
an acquisition unit that acquires first detection data indicating a result of detecting a vibration at a first point of a belt conveyor and second detection data indicating a result of detecting a vibration at a second point on a downstream side of the first point of the belt conveyor; and
a determination unit that determines that an abnormality occurs in the belt conveyor with a necessary condition that a result of comparing the first detection data and the second detection data satisfies a first reference.

The present invention provides a vibration processing method including:
by a computer,
acquiring first detection data indicating a result of detecting a vibration at a first point of a belt conveyor and second detection data indicating a result of detecting a vibration at a second point on a downstream side of the first point of the belt conveyor; and
determining that an abnormality occurs in the belt conveyor with a necessary condition that a result of comparing the first detection data and the second detection data satisfies a first reference.

The present invention provides a program causing a computer to include:
a function of acquiring first detection data indicating a result of detecting a vibration at a first point of a belt conveyor and second detection data indicating a result of detecting a vibration at a second point on a downstream side of the first point of the belt conveyor; and
a function of determining that an abnormality occurs in the belt conveyor with a necessary condition that a result of comparing the first detection data and the second detection data satisfies a first reference.

Advantageous Effects of Invention

According to the present invention, whether an abnormality occurs in a belt conveyor can be accurately determined.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

Figure 1:
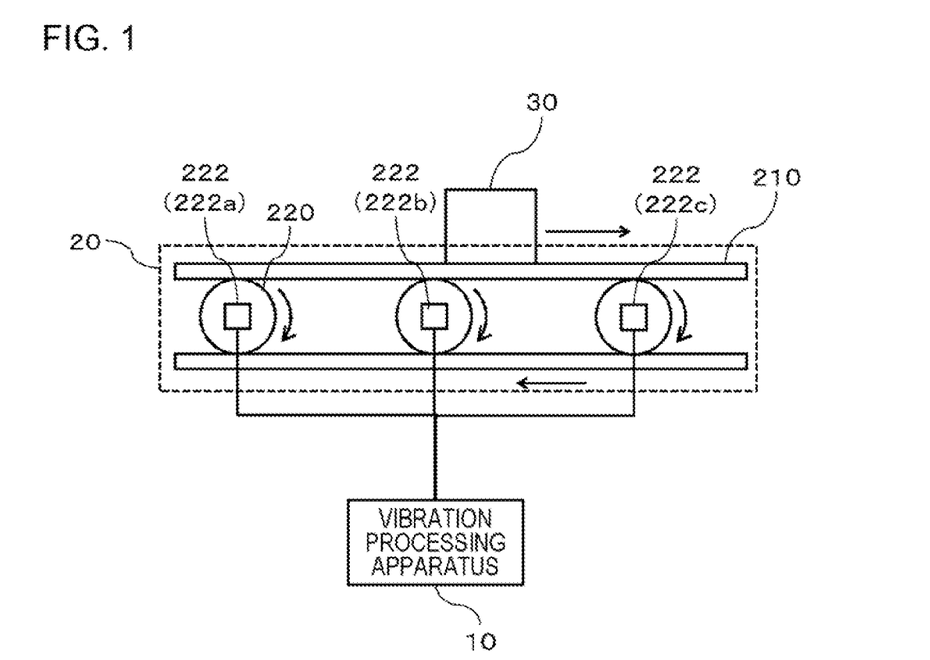
FIG. 1 is diagram for describing a usage environment of a vibration processing apparatus according to an example embodiment.

FIG. 1 is diagram for describing a usage environment of a vibration processing apparatus 10 according to an example embodiment. The vibration processing apparatus 10 according to the example embodiment detects an abnormality occurring in a belt conveyor 20, by processing a vibration generated in the belt conveyor 20. The belt conveyor 20 conveys coal, coke, and the like at an iron mill and a power plant, for example. Further, when the belt conveyor 20 is installed at an iron mill, the belt conveyor 20 may convey ironstone.

A plurality of vibration sensors 222 are attached to the belt conveyor 20. In the example illustrated in FIG. 1, the belt conveyor 20 includes a plurality of rotating shafts 220. The vibration sensor 222 detects a vibration generated in a belt 210 or the rotating shaft of the belt conveyor 20. In the example illustrated in FIG. 1, the vibration sensor 222 is attached to each of or the vicinity of the plurality of rotating shafts 220. However, the vibration sensor 222 may also be attached to another portion of the belt conveyor 20.

As an abnormality occurring in the belt conveyor 20, there are a partial rupture of the belt 210, a fall of a conveyed object 30, an abnormality in the rotating shaft 220, and the like. Then, when the abnormalities occur, a vibration different from a normal vibration is generated in the belt 210 or the rotating shaft 220. The vibration processing apparatus 10 processes the vibration detected by the vibration sensor 222, and thus detects the abnormality.

Figure 2:
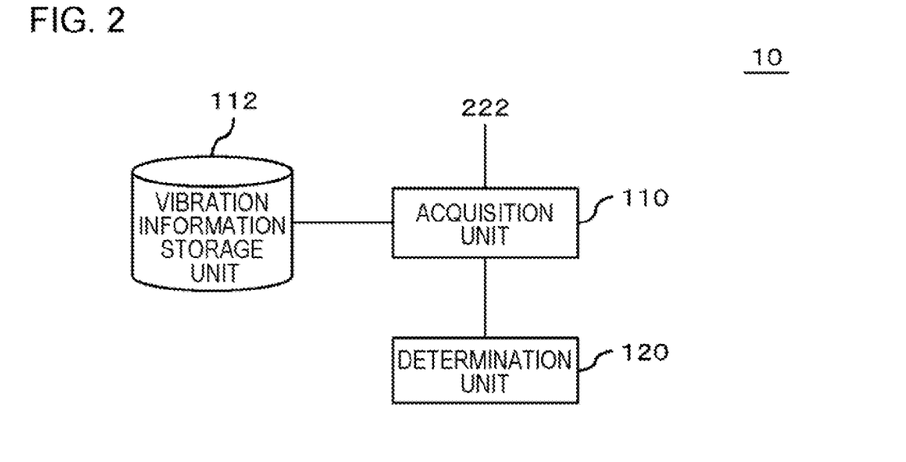
FIG. 2 is a diagram illustrating one example of a functional configuration of the vibration processing apparatus.

FIG. 2 is a diagram illustrating one example of a functional configuration of the vibration processing apparatus 10. In the example illustrated in FIG. 2, the vibration processing apparatus 10 includes an acquisition unit 110 and a determination unit 120.

The acquisition unit 110 acquires data (hereinafter described as detection data) indicating a detection result of each of the plurality of vibration sensors 222, in association with information (hereinafter described as sensor identification information) that identifies the vibration sensor 222 that generates the detection data. Further, the acquisition unit 110 stores the detection data in association with the sensor identification information in a vibration information storage unit 112.

Note that, the acquisition unit 110 may store the detection data acquired from the vibration sensor 222 as they are in the vibration information storage unit 112, or may store data (for example, data after a fast Fourier transform is performed) after the detection data are processed in the vibration information storage unit 112. In the following description, the latter data are also described as the detection data.

Further, the acquisition unit 110 reads, from the vibration information storage unit 112, information needed for detecting an abnormality in the belt conveyor 20. The information is, for example, first detection data indicating a result of detecting a vibration at a first point of the belt conveyor 20, and second detection data indicating a result of detecting a vibration at a second point on a downstream side of the first point of the belt conveyor 20. For example, the first detection data are detection data generated by a vibration sensor 222a in FIG. 1, and the second detection data are detection data generated by a vibration sensor 222b in FIG. 1. In this case, the rotating shaft 220 is installed at both of the first point and the second point.

Further, the acquisition unit 110 also reads third detection data as necessary. The third detection data indicate a result of detecting a vibration at a third point on a downstream side of the second point of the belt conveyor 20. For example, the third detection data are detection data generated by a vibration sensor 222c in FIG. 1. In this case, the rotating shaft 220 is also installed at the third point.

The determination unit 120 determines that an abnormality occurs in the belt conveyor with a necessary condition or a necessary and sufficient condition that a result of comparing the first detection data and the second detection data satisfies a first reference. For the determination, the determination unit 120 also uses the third detection data as necessary. Details of processing performed by the determination unit 120 and a specific example of the first reference will be described later.

Figure 3:
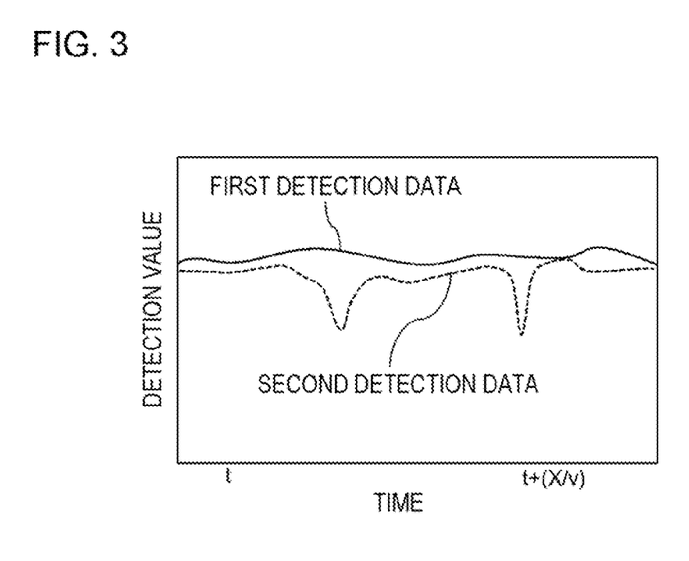
FIG. 3 is a diagram for describing a first example of processing performed by a determination unit and a first reference.

FIG. 3 is a diagram for describing a first example of the processing performed by the determination unit 120 and the first reference. FIG. 3 illustrates the first detection data and the second detection data. In this example, the detection data indicate a time change in vibration energy or amplitude by wavelength. Then, a characteristic peak does not occur in the first detection data, but a peak of a vibration amount (vibration energy or amplitude) periodically occurs in the second detection data. In this case, there is a high possibility that an abnormality occurs at the second point. Thus, by setting this as the first reference, the determination unit 120 can detect an occurrence of an abnormality in the belt conveyor 20. Then, the determination unit 120 outputs warning information indicating this to a terminal of a manager of the belt conveyor 20, for example.

Note that, when a peak of the second detection data is in a negative direction (i.e., a vibration amount decreases), there is a high possibility that an abnormality occurring at the second point is a fall of a conveyed object. In this case, the determination unit 120 outputs, to the terminal of the manager of the belt conveyor 20, for example, warning information indicating that there is a possibility that a conveyed object has fallen.

Figure 4:
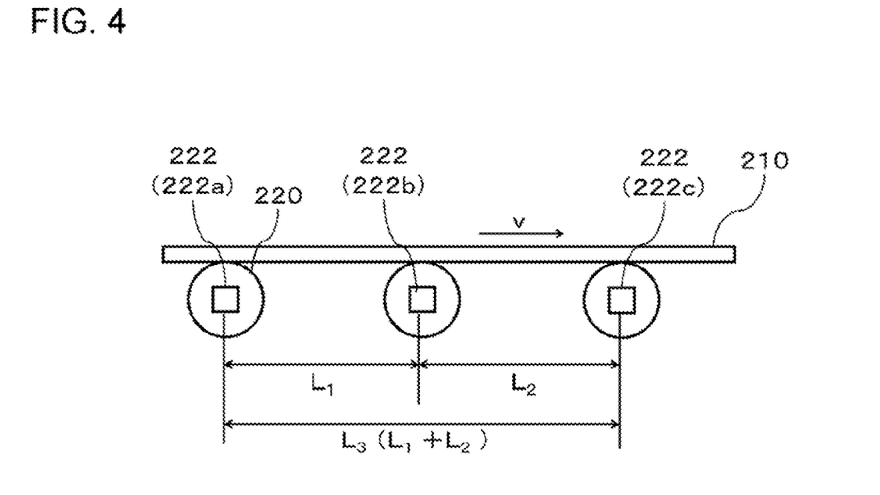
FIG. 4 is a diagram for describing a second example of the processing performed by the determination unit and the first reference.
Figure 5:
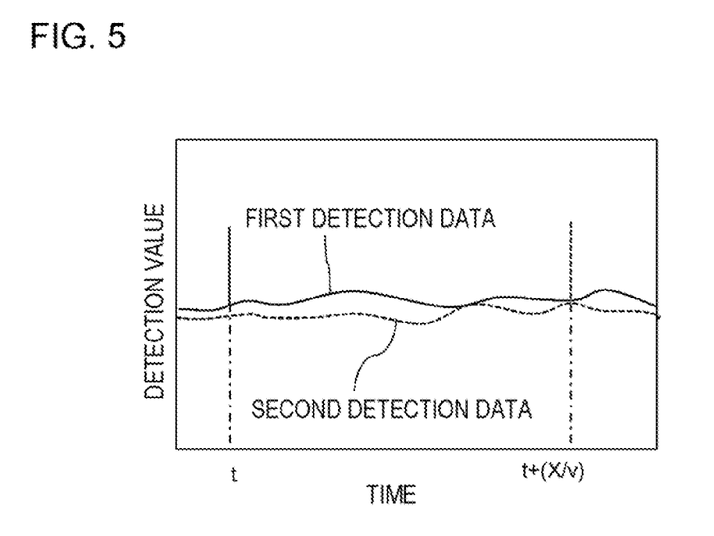
FIG. 5 is a diagram for describing the second example of the processing performed by the determination unit and the first reference.

FIGS. 4 and 5 are diagrams for describing a second example of the processing performed by the determination unit 120 and the first reference.

In a case where a crack is generated in the belt 210 or the conveyed object 30 is contaminated with a foreign matter, when the portion of the belt 210 passes through the rotating shaft 220, an abnormal vibration is generated in the rotating shaft 220. Thus, when an abnormal vibration is generated in a certain rotating shaft 220, a similar abnormal vibration is also generated in the rotating shaft 220 on a downstream side of the certain rotating shaft 220, and an interval at which the two abnormal vibrations are detected is equal to a period of time during which the belt 210 moves between the two rotating shafts 220, there is a high possibility that a crack is generated in the belt 210 or the conveyed object 30 is contaminated with a foreign matter.

As one example, as illustrated in FIG. 4, when a velocity of the belt conveyor is v, and an interval (i.e., an interval between the first point and the second point) between the vibration sensor 222a and the vibration sensor 222b is $L_1$, a period of time since an abnormality occurs in a vibration of the vibration sensor 222a until an abnormality occurs in a vibration of the vibration sensor 222b is $L_1/V$.

Thus, the determination unit 120 determines that an abnormality occurs in the belt conveyor 20 with a necessary condition that a result of comparing a detection result of the first detection data at a first timing and a detection result of the second detection data at a second timing after the first timing satisfies the first reference.

Herein, as illustrated in FIG. 4, when a difference between the first timing and the second timing is $t_1$, a velocity of the belt conveyor is v, and an interval (i.e., an interval between the vibration sensor 222a and the vibration sensor 222b) between the first point and the second point is $L_1$, $t_1$ is equal to or more than 0.8 times and equal to or less than 1.2 times $L_1/V$, and is preferably equal to or more than 0.95 times and equal to or less than 1.05 times $L_1/V$. Then, when a fact that a change in the first detection data at the first timing and a change in the second detection data at the second timing exhibit an identical tendency (for example, a peak in the same direction occurs) is set as the first reference, the determination unit 120 can detect a possibility that a crack is generated in the belt 210 and a possibility that the conveyed object 30 is contaminated with a foreign matter. Then, the determination unit 120 outputs warning information indicating this to the terminal of the manager of the belt conveyor 20, for example.

Note that, the acquisition unit 110 and the determination unit 120 perform the following processing as a result of detecting a vibration of the vibration sensor 222c, i.e., when the third detection data are used.

In the first example, the acquisition unit 110 reads the third detection data from the vibration information storage unit 112. The third detection data read herein are a result of detecting a vibration at a third timing after the second timing. Then, the determination unit 120 also sets, as a necessary condition for determining that an abnormality occurs in the belt conveyor, a fact that a result of comparing the second detection data and the third detection data satisfies the first reference, in addition to a fact that a result of comparing a detection result of the first detection data at the first timing and a detection result of the second detection data at the second timing after the first timing satisfies the first reference. Herein, when a difference between the second timing and the third timing is $t_2$ and an interval between the second point and the third point is $L_2$ as illustrated in FIG. 4, $t_2$ is equal to or more than 0.8 times and equal to or less than 1.2 times $L_2/v$, and is preferably equal to or more than 0.95 times and equal to or less than 1.05 times $L_2/v$.

In the second example, the acquisition unit 110 reads the third detection data from the vibration information storage unit 112. The third detection data read herein are also a result of detecting a vibration at the third timing after the second timing. Then, the determination unit 120 also sets, as a necessary condition for determining that an abnormality occurs in the belt conveyor, a fact that a result of comparing the first detection data and the third detection data satisfies the first reference, in addition to a fact that a result of comparing a detection result of the first detection data at the first timing and a detection result of the second detection data at the second timing after the first timing satisfies the first reference. Herein, when a difference between the first timing and the third timing is $t_3$ and an interval between the first point and the third point is $L_3$ as illustrated in FIG. 4, $t_3$ is equal to or more than 0.8 times and equal to or less than 1.2 times $L_3/v$, and is preferably equal to or more than 0.95 times and equal to or less than 1.05 times $L_3/v$.

Since a necessary condition for determining an abnormality is increased by further using the third detection data, a false determination by the determination unit 120 is reduced.

Note that, the processing using the third detection data may be performed after an abnormality is determined as a result of comparing the first detection data and the second detection data described above, for example. In this case, the determination unit 120 further sets, as a condition for outputting warning information to the terminal of the manager of the belt conveyor 20, a fact that an abnormality is determined in the first or second example described above.

As described above, the first reference used by the determination unit 120 can be set to be different for each kind of an abnormality occurring in the belt conveyor 20. In this case, when any first reference is satisfied, the determination unit 120 can output, to the terminal of the manager of the belt conveyor 20, information indicating a kind of an abnormality associated with the first reference. In this way, the manager of the belt conveyor 20 can recognize the kind of the abnormality occurring in the belt conveyor 20 by confirming the output from the determination unit 120.

Figure 6:
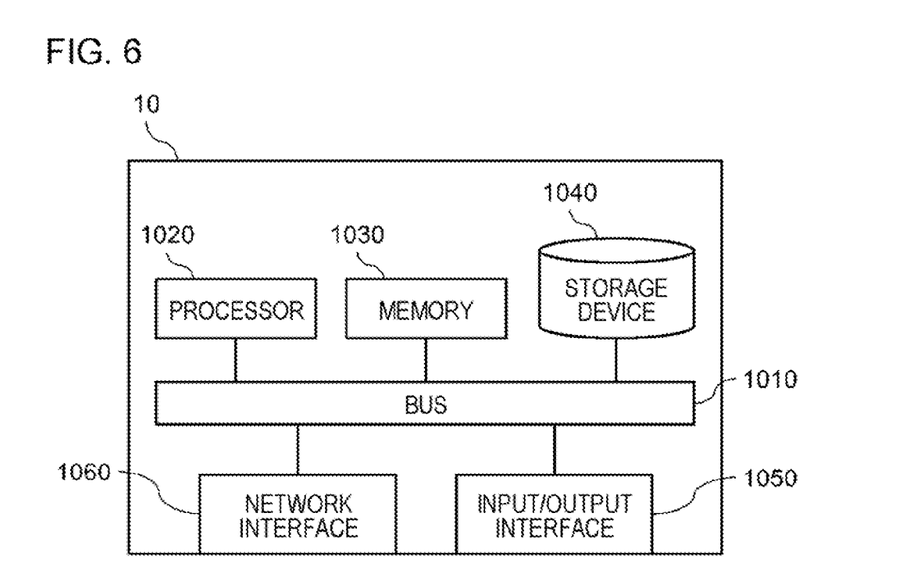
FIG. 6 is a diagram illustrating a hardware configuration example of the vibration processing apparatus.

FIG. 6 is a diagram illustrating a hardware configuration example of the vibration processing apparatus 10. The vibration processing apparatus 10 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (for example, the acquisition unit 110 and the determination unit 120) of the vibration processing apparatus 10. The processor 1020 reads each program module onto the memory 1030 and executes the program module, and each function associated with the program module is achieved. Further, the storage device 1040 also functions as the vibration information storage unit 112.

The input/output interface 1050 is an interface for connecting the vibration processing apparatus 10 and various types of input/output equipment. For example, the vibration processing apparatus 10 communicates with the vibration sensor 222 via the input/output interface 1050.

The network interface 1060 is an interface for connecting the vibration processing apparatus 10 to a network. The network is, for example, a local area network (LAN) and a wide area network (WAN). A method of connection to the network by the network interface 1060 may be wireless connection or wired connection. The vibration processing apparatus 10 may communicate with the vibration sensor 222 via the network interface 1060.

Figure 7:
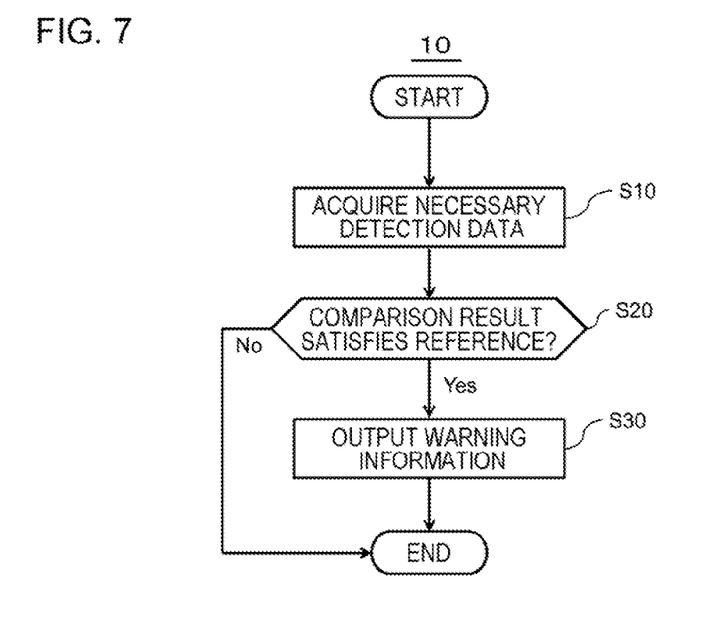
FIG. 7 is a flowchart illustrating one example of an operation of the vibration processing apparatus.

FIG. 7 is a flowchart illustrating one example of an operation of the vibration processing apparatus 10. The vibration processing apparatus 10 regularly performs processing illustrated in FIG. 7.

In addition to the processing illustrated in FIG. 7, the acquisition unit 110 repeatedly acquires a detection result of the plurality of vibration sensors 222, and updates the vibration information storage unit 112.

Then, the acquisition unit 110 reads detection data needed for an abnormality determination from the vibration information storage unit 112. A specific example of the detection data is as described by using FIGS. 3 to 5 (step S10).

Then, the determination unit 120 determines whether an abnormality occurs in the belt conveyor 20 by comparing the detection data being read by the acquisition unit 110. A specific example of the determination performed herein is also as described by using FIGS. 3 to 5 (step S20). Then, when a comparison result satisfies a reference (step S20: Yes), there is a high possibility that an abnormality occurs in the belt conveyor 20, and thus the determination unit 120 outputs information (warning information) indicating the possibility to a terminal of a manager of the belt conveyor 20 (step S30). Note that, when the vibration processing apparatus 10 includes a display, the determination unit 120 may display the warning information on the display.

As described above, according to the present example embodiment, the determination unit 120 compares a vibration detection result (first detection data) at the first point of the belt conveyor 20 and a vibration detection result (second detection data) at the second point, determines whether the comparison result satisfies a first reference, and thus determines an abnormality in the belt conveyor 20. Thus, as compared to a case where an abnormality is determined with only the first detection data, false detection of an abnormality can be reduced. Therefore, whether an abnormality occurs in the belt conveyor 20 can be accurately determined by using the vibration processing apparatus 10.

Further, a different first reference can be set by kind of an abnormality (for example, a rupture of the belt 210 and a fall of the conveyed object 30). Thus, the determination unit 120 can also estimate a kind of an occurring abnormality.

While the example embodiments of the present invention have been described with reference to the drawings, the example embodiments are only exemplification of the present invention, and various configurations other than the above-described example embodiments can also be employed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. A vibration processing apparatus, including:
    an acquisition unit that acquires first detection data indicating a result of detecting a vibration at a first point of a belt conveyor and second detection data indicating a result of detecting a vibration at a second point on a downstream side of the first point of the belt conveyor; and
    a determination unit that determines that an abnormality occurs in the belt conveyor with a necessary condition that a result of comparing the first detection data and the second detection data satisfies a first reference.
2. The vibration processing apparatus according to supplementary note 1 described above, wherein
    a rotating shaft is installed at the first point and the second point.
3. The vibration processing apparatus according to supplementary note 1 or 2 described above, wherein
    the determination unit determines that an abnormality occurs in the belt conveyor with a necessary condition that a result of comparing a detection result of the first detection data at a first timing and a detection result of the second detection data at a second timing after the first timing satisfies the first reference, and,
    when a difference between the first timing and the second timing is $t_1$, a velocity of the belt conveyor is v, and an interval between the first point and the second point is $L_1$, the $t_1$ is equal to or more than 0.8 times and equal to or less than 1.2 times $L_1/V$.
4. The vibration processing apparatus according to supplementary note 3 described above, wherein
    the acquisition unit acquires third detection data including a result of detecting a vibration at a third timing after the second timing at a third point on a downstream side of the second point of the belt conveyor,
    the determination unit further determines that an abnormality occurs in the belt conveyor with a necessary condition that a result of comparing the second detection data and the third detection data satisfies the first reference, and,
    when a difference between the second timing and the third timing is $t_2$ and an interval between the second point and the third point is $L_2$, the $t_2$ is equal to or more than 0.8 times and equal to or less than 1.2 times $L_2/v$.
5. The vibration processing apparatus according to supplementary note 3 described above, wherein
    the acquisition unit acquires third detection data indicating a result of detecting a vibration at a third timing after the second timing at a third point on a downstream side of the second point of the belt conveyor,
    the determination unit further determines that an abnormality occurs in the belt conveyor with a necessary condition that a result of comparing the first detection data and the third detection data satisfies the first reference, and,
    when a difference between the first timing and the third timing is $t_3$ and an interval between the first point and the third point is $L_3$, the $t_3$ is equal to or more than 0.8 times and equal to or less than 1.2 times $L_3/v$.
6. The vibration processing apparatus according to any one of supplementary notes 3 to 5 described above, wherein
    the first reference is a fact that a change in the first detection data at the first timing and a change in the second detection data at the second timing exhibit an identical tendency.
7. The vibration processing apparatus according to any one of supplementary notes 1 to 6 described above, wherein
    the first reference is set for each kind of the abnormality, and,
    when any first reference is satisfied, the determination unit outputs information indicating a kind of the abnormality associated with the first reference.
8. A vibration processing method, including:
    by a computer,
    acquiring first detection data indicating a result of detecting a vibration at a first point of a belt conveyor and second detection data indicating a result of detecting a vibration at a second point on a downstream side of the first point of the belt conveyor; and
    determining that an abnormality occurs in the belt conveyor with a necessary condition that a result of comparing the first detection data and the second detection data satisfies a first reference.
9. The vibration processing method according to supplementary note 8 described above, wherein
    a rotating shaft is installed at the first point and the second point.
10. The vibration processing method according to supplementary note 8 or 9 described above, further including,
    by the computer,
    determining that an abnormality occurs in the belt conveyor with a necessary condition that a result of comparing a detection result of the first detection data at a first timing and a detection result of the second detection data at a second timing after the first timing satisfies the first reference, wherein,
    when a difference between the first timing and the second timing is $t_1$, a velocity of the belt conveyor is v, and an interval between the first point and the second point is $L_1$, the $t_1$ is equal to or more than 0.8 times and equal to or less than 1.2 times $L_1/v$.
11. The vibration processing method according to supplementary note 10 described above, further including:
    by the computer,
    acquiring third detection data including a result of detecting a vibration at a third timing after the second timing at a third point on a downstream side of the second point of the belt conveyor; and
    further determining that an abnormality occurs in the belt conveyor with a necessary condition that a result of comparing the second detection data and the third detection data satisfies the first reference, wherein,
    when a difference between the second timing and the third timing is $t_2$ and an interval between the second point and the third point is $L_2$, the $t_2$ is equal to or more than 0.8 times and equal to or less than 1.2 times $L_2/v$.

12. The vibration processing method according to supplementary note 10 described above, further including:
    by the computer,
    acquiring third detection data indicating a result of detecting a vibration at a third timing after the second timing at a third point on a downstream side of the second point of the belt conveyor; and
    further determining that an abnormality occurs in the belt conveyor with a necessary condition that a result of comparing the first detection data and the third detection data satisfies the first reference, wherein,
    when a difference between the first timing and the third timing is $t_3$ and an interval between the first point and the third point is $L_3$, the $t_3$ is equal to or more than 0.8 times and equal to or less than 1.2 times $L_3/v$.

13. The vibration processing method according to any one of supplementary notes 10 to 12 described above, wherein
    the first reference is a fact that a change in the first detection data at the first timing and a change in the second detection data at the second timing exhibit an identical tendency.

14. The vibration processing method according to any one of supplementary notes 8 to 13 described above, wherein
    the first reference is set for each kind of the abnormality,
    the vibration processing method further including,
    by the computer,
    when any first reference is satisfied, outputting information indicating a kind of the abnormality associated with the first reference.

15. A program causing a computer to include:
    a function of acquiring first detection data indicating a result of detecting a vibration at a first point of a belt conveyor and second detection data indicating a result of detecting a vibration at a second point on a downstream side of the first point of the belt conveyor; and
    a function of determining that an abnormality occurs in the belt conveyor with a necessary condition that a result of comparing the first detection data and the second detection data satisfies a first reference.

16. The program according to supplementary note 15 described above, wherein
    a rotating shaft is installed at the first point and the second point.

17. The program according to supplementary note 15 or 16 described above, further causing the computer to include
    determining that an abnormality occurs in the belt conveyor with a necessary condition that a result of comparing a detection result of the first detection data at a first timing and a detection result of the second detection data at a second timing after the first timing satisfies the first reference, wherein,
    when a difference between the first timing and the second timing is $t_1$, a velocity of the belt conveyor is v, and an interval between the first point and the second point is $L_1$, the $t_1$ is equal to or more than 0.8 times and equal to or less than 1.2 times $L_1/V$.

18. The program according to supplementary note 17 described above, further causing the computer to include:
    acquiring third detection data including a result of detecting a vibration at a third timing after the second timing at a third point on a downstream side of the second point of the belt conveyor; and
    further determining that an abnormality occurs in the belt conveyor with a necessary condition that a result of comparing the second detection data and the third detection data satisfies the first reference, wherein,
    when a difference between the second timing and the third timing is $t_2$ and an interval between the second point and the third point is $L_2$, the $t_2$ is equal to or more than 0.8 times and equal to or less than 1.2 times $L_2/v$.

19. The program according to supplementary note 17 described above, further causing the computer to include:
    acquiring third detection data indicating a result of detecting a vibration at a third timing after the second timing at a third point on a downstream side of the second point of the belt conveyor; and
    further determining that an abnormality occurs in the belt conveyor with a necessary condition that a result of comparing the first detection data and the third detection data satisfies the first reference, wherein,
    when a difference between the first timing and the third timing is $t_3$ and an interval between the first point and the third point is $L_3$, the $t_3$ is equal to or more than 0.8 times and equal to or less than 1.2 times $L_3/v$.

20. The program according to any one of supplementary notes 17 to 19 described above, wherein
    the first reference is a fact that a change in the first detection data at the first timing and a change in the second detection data at the second timing exhibit an identical tendency.

21. The program according to any one of supplementary notes 15 to 20 described above, wherein
    the first reference is set for each kind of the abnormality,
    the program further causing the computer to include,
    when any first reference is satisfied, outputting information indicating a kind of the abnormality associated with the first reference.

This application is based upon and claims the benefit of priority from Japanese patent application No. 2020-016593, filed on Feb. 3, 2020, the disclosure of which is incorporated herein in its entirety by reference.

REFERENCE SIGNS LIST

10 Vibration processing apparatus
20 Belt conveyor
30 Conveyed object
110 Acquisition unit
112 Vibration information storage unit
120 Determination unit
210 Belt
220 Rotating shaft
222 Vibration sensor

What is claimed is:

1. A vibration processing apparatus, comprising:
    at least one memory configured to store instructions; and
    at least one processor configured to execute the instructions to:
    acquire first detection data indicating a result of detecting a vibration at a first point of a belt conveyor and second detection data indicating a result of detecting a vibration at a second point on a downstream side of the first point of the belt conveyor; and
    determine that an abnormality occurs in the belt conveyor with a necessary condition that a result of comparing the first detection data and the second detection data satisfies a first reference, wherein
    a rotating shaft is installed at the first point and the second point.

2. The vibration processing apparatus according to claim 1, wherein the first reference is set for each kind of the abnormality, and, the at least one processor is further configured to execute the instructions to:

when any first reference is satisfied, output information indicating a kind of the abnormality associated with the first reference.

3. The vibration processing apparatus according to claim 1, wherein the at least one processor is further configured to execute the instructions to:

determine that an abnormality occurs in the belt conveyor with a necessary condition that a result of comparing a detection result of the first detection data at a first timing and a detection result of the second detection data at a second timing after the first timing satisfies the first reference, and, when a difference between the first timing and the second timing is t1, a velocity of the belt conveyor is v, and an interval between the first point and the second point is L1, the t1 is equal to or more than 0.8 times and equal to or less than 1.2 times L1/v.

4. The vibration processing apparatus according to claim 3, wherein the at least one processor is further configured to execute the instructions to:

acquire third detection data including a result of detecting a vibration at a third timing after the second timing at a third point on a downstream side of the second point of the belt conveyor, further determine that an abnormality occurs in the belt conveyor with a necessary condition that a result of comparing the second detection data and the third detection data satisfies the first reference, and, when a difference between the second timing and the third timing is t2 and an interval between the second point and the third point is L2, the t2 is equal to or more than 0.8 times and equal to or less than 1.2 times L2/v.

5. The vibration processing apparatus according to claim 3, wherein the at least one processor is further configured to execute the instructions to:

acquire third detection data indicating a result of detecting a vibration at a third timing after the second timing at a third point on a downstream side of the second point of the belt conveyor, further determine that an abnormality occurs in the belt conveyor with a necessary condition that a result of comparing the first detection data and the third detection data satisfies the first reference, and, when a difference between the first timing and the third timing is t3 and an interval between the first point and the third point is L3, the t3 is equal to or more than 0.8 times and equal to or less than 1.2 times L3/v.

6. The vibration processing apparatus according to claim 3, wherein the first reference is a fact that a change in the first detection data at the first timing and a change in the second detection data at the second timing exhibit an identical tendency.

7. A vibration processing method, comprising:

by a computer, acquiring first detection data indicating a result of detecting a vibration at a first point of a belt conveyor and second detection data indicating a result of detecting a vibration at a second point on a downstream side of the first point of the belt conveyor; and determining that an abnormality occurs in the belt conveyor with a necessary condition that a result of comparing the first detection data and the second detection data satisfies a first reference, wherein a rotating shaft is installed at the first point and the second point.

8. The vibration processing method according to claim 7, wherein the first reference is set for each kind of the abnormality, the vibration processing method further comprising, by the computer, when any first reference is satisfied, outputting information indicating a kind of the abnormality associated with the first reference.

9. The vibration processing method according to claim 7, further comprising, by the computer, determining that an abnormality occurs in the belt conveyor with a necessary condition that a result of comparing a detection result of the first detection data at a first timing and a detection result of the second detection data at a second timing after the first timing satisfies the first reference, wherein, when a difference between the first timing and the second timing is t1, a velocity of the belt conveyor is v, and an interval between the first point and the second point is L1, the t1 is equal to or more than 0.8 times and equal to or less than 1.2 times L1/v.

10. The vibration processing method according to claim 9, further comprising:

by the computer, acquiring third detection data including a result of detecting a vibration at a third timing after the second timing at a third point on a downstream side of the second point of the belt conveyor; and further determining that an abnormality occurs in the belt conveyor with a necessary condition that a result of comparing the second detection data and the third detection data satisfies the first reference, wherein, when a difference between the second timing and the third timing is t2 and an interval between the second point and the third point is L2, the t2 is equal to or more than 0.8 times and equal to or less than 1.2 times L2/v.

11. The vibration processing method according to claim 9, further comprising:

by the computer, acquiring third detection data indicating a result of detecting a vibration at a third timing after the second timing at a third point on a downstream side of the second point of the belt conveyor; and further determining that an abnormality occurs in the belt conveyor with a necessary condition that a result of comparing the first detection data and the third detection data satisfies the first reference, wherein, when a difference between the first timing and the third timing is t3 and an interval between the first point and the third point is L3, the t3 is equal to or more than 0.8 times and equal to or less than 1.2 times L3/v.

12. The vibration processing method according to claim 9, wherein the first reference is a fact that a change in the first detection data at the first timing and a change in the second detection data at the second timing exhibit an identical tendency.

13. A non-transitory computer-readable storage medium storing a program causing a computer to execute:

a procedure for acquiring first detection data indicating a result of detecting a vibration at a first point of a belt conveyor and second detection data indicating a result of detecting a vibration at a second point on a downstream side of the first point of the belt conveyor; and
a procedure for determining that an abnormality occurs in the belt conveyor with a necessary condition that a result of comparing the first detection data and the second detection data satisfies a first reference, wherein
a rotating shaft is installed at the firs point and the second point.

14. The non-transitory computer-readable storage medium according to claim 13, wherein the program further causes the computer to execute
a procedure for determining that an abnormality occurs in the belt conveyor with a necessary condition that a result of comparing a detection result of the first detection data at a first timing and a detection result of the second detection data at a second timing after the first timing satisfies the first reference, wherein,
when a difference between the first timing and the second timing is t1, a velocity of the belt conveyor is v, and an interval between the first point and the second point is L1, the t1 is equal to or more than 0.8 times and equal to or less than 1.2 times L1/v.

15. The non-transitory computer-readable storage medium according to claim 14, wherein the program further causes the computer to execute:
a procedure for acquiring third detection data including a result of detecting a vibration at a third timing after the second timing at a third point on a downstream side of the second point of the belt conveyor; and
a procedure for further determining that an abnormality occurs in the belt conveyor with a necessary condition that a result of comparing the second detection data and the third detection data satisfies the first reference, wherein,
when a difference between the second timing and the third timing is t2 and an interval between the second point and the third point is L2, the t2 is equal to or more than 0.8 times and equal to or less than 1.2 times L2/v.

16. The non-transitory computer-readable storage medium according to claim 14, wherein the program further causes the computer to execute:
a procedure for acquiring third detection data indicating a result of detecting a vibration at a third timing after the second timing at a third point on a downstream side of the second point of the belt conveyor; and
a procedure for further determining that an abnormality occurs in the belt conveyor with a necessary condition that a result of comparing the first detection data and the third detection data satisfies the first reference, wherein,
when a difference between the first timing and the third timing is t3 and an interval between the first point and the third point is L3, the t3 is equal to or more than 0.8 times and equal to or less than 1.2 times L3/v.

17. The non-transitory computer-readable storage medium according to claim 14, wherein
the first reference is a fact that a change in the first detection data at the first timing and a change in the second detection data at the second timing exhibit an identical tendency.

* * * * *